US008749781B2

(12) United States Patent
Masters

(10) Patent No.: US 8,749,781 B2
(45) Date of Patent: Jun. 10, 2014

(54) HIGH RESOLUTION SLIT-FREE DIRECT-VIEWING MULTIPLEXING FIELD SPECTROGRAPH

(76) Inventor: Ronald Anthony Masters, Glenview, IL (US)

( * ) Notice: Subject to any disclaimer, the term of this patent is extended or adjusted under 35 U.S.C. 154(b) by 535 days.

(21) Appl. No.: 13/107,927

(22) Filed: May 15, 2011

(65) Prior Publication Data

US 2012/0287430 A1    Nov. 15, 2012

(51) Int. Cl.
*G01J 3/28* (2006.01)

(52) U.S. Cl.
USPC .......................................................... 356/328

(58) Field of Classification Search
CPC ............. G01J 3/02; G01J 3/0291; G01J 3/18; G01J 3/0208
USPC ................................................ 356/326–328
See application file for complete search history.

(56) References Cited

U.S. PATENT DOCUMENTS

| | | | | |
|---|---|---|---|---|
| 5,173,748 A * | 12/1992 | Bilhorn | ......................... | 356/328 |
| 5,689,333 A * | 11/1997 | Batchelder et al. | ........... | 356/301 |
| 2002/0181856 A1* | 12/2002 | Sappey et al. | ................... | 385/24 |
| 2004/0109159 A1* | 6/2004 | Schau | ........................... | 356/328 |
| 2007/0030483 A1* | 2/2007 | Everett et al. | ................. | 356/328 |

* cited by examiner

*Primary Examiner* — Kara E Geisel
(74) *Attorney, Agent, or Firm* — Justin Lampel

(57) ABSTRACT

A compact field spectrograph is described that provides a resolution of 500 or more with no entrance aperture, providing for substantial gain in light throughput, ideal for viewing multiple distant objects with or without telescopic aid, and providing the ability to observe and distinguish a multiplex of objects simultaneously, even if in motion, with minimal or no mechanical tracking required. Spectra may be viewed directly with the unaided eye, or photographed with common consumer cameras.

19 Claims, 2 Drawing Sheets

HIGH RESOLUTION SLIT-FREE DIRECT-VIEWING MULTIPLEXING FIELD SPECTROGRAPH

BACKGROUND OF THE INVENTION

Slitless spectrographs are known, in which the traditional exit slit is replaced by an imaging sensor to simultaneously record an entire spectral range. A recent report using this type of device for field spectroscopy is Jenniskens "Observations of the Stardust Sample Return Capsule Entry with a Slitless Echelle Spectrograph", Journal of Spacecraft and Rockets, Vol 47, No. 5, September-October 2010. Although described in the title as "Slitless", it is clear to one skilled in the art that "slitless" refers to lack of an exit aperture. The named spectrograph contains an entrance aperture to achieve high resolutions of about 1000 to 2400, depending on wavelength. Use of the entrance aperture restricts light throughput, and as the object moves through the field, the spectrograph or entrance optics must be mechanically guided to stay trained on the object being studied. It would not be possible to simultaneously monitor the spectra of multiple objects in different locations within the field of view with this spectrograph. It would also be impossible to monitor the spectra of multiple objects that move in different directions.

Imaging spectrographs that can view multiple objects simultaneously are known, with a recent example described by Wang, et al., "Apparatus For Measuring Spectrographic Images", U.S. Pat. No. 7,414,718. Although the Independent Claims do not require the use of an entrance aperture, the Detailed Drawings of the Inventive Designs (FIGS. 4 and 8) and the Summary Of The Invention teach that the device "comprises an imaging side telecentric lens for collecting optical energy from an object, an optical slit positioned behind the imaging side telecentric lens, . . . ". To one skilled in the art, it is clear that if high resolution is desired, an entrance slit is necessary, and hence Wang, et al. include the entrance slit (130 in FIGS. 4 and 8) in the design drawings, the Summary Of The Invention, and as a Dependent Claim. Without an entrance slit, the design of Wang, et al. would not be able to achieve high spectral resolution.

Commercial examples of high resolution, compact, lightweight echelle spectrographs are known, an example being Hilliard, "Imaging Spectrograph For Multiorder Spectroscopy", U.S. Pat. No. 6,628,383. This is the spectrograph used by Jenniskens referenced above, requiring an entrance aperture to achieve high resolution, and mechanical movement to remain trained on moving objects.

The echelle grating was developed in 1949 by George R. Harrison: "The Production of Diffraction Gratings: II. The Design of Echelle Gratings and Spectrographs," J. Opt. Soc. Am. 39, 522-527 (1949). Pre-dating the development of the echelle, Carl King described a high resolution spectrometer design in which the entrance slit is replaced by a positive or negative lens of short focal length relative to the object and observing distance: Carl King, "A Lens to Supplant the Spectrograph Slit," J. Opt. Soc. Am. 36, 164-164 (1946). King's development was hindered by movement of the plasma arc source being observed, creating wandering line positions at the photographic plates used to record the spectra, so he ultimately included an entrance aperture in his designs ("B" in FIG. 3 of the above reference). He also shows cylindrical condensing lenses to focus the source light onto the entrance aperture ("Cx" in FIG. 3) in the shape of a slit. Not being able to fully eliminate the entrance aperture, then, King's development has not been utilized in any known spectrometer or spectrograph design since his initial report.

A significant advance in utility, especially for field use, would be realized if the entrance aperture could be eliminated while maintaining high resolution. Simple transmission gratings are commonly used to obtain spectra without an entrance aperture, coupled directly to a camera at the field lens. These, however, are of poor resolution in the range of 50-100, typically producing 5-10 nm line widths at 500 nm. Longer paths and special scanning procedures can improve their resolution, but then compromising the ability to obtain spectra of a wide field of multiple objects. It is understood in the industry that the wider the field and more objects viewed, the poorer the available resolution. The ability to obtain high resolution spectra across a visual field of multiple objects simultaneously would have numerous advantages for identification of unknown distant luminous objects, such as multiple stars or planets in a field of view, or various terrestrial objects under observation from a distance greater than that of a laboratory bench. This would include objects that are in motion across the field of view, even in differing directions. No high resolution spectrograph design to date has been able to accommodate this typical situation encountered in field use. High resolution for this work is defined as 500 or greater. This corresponds to line widths of 1 nm or less at 500 nm. Wide field for this work is defined as greater than 1-degree, preferably greater than 10-degrees, most preferably greater than 30 degrees, to enable the spectral recording of multiple objects that might be moving, simultaneously, without the need to mechanically track the spectrograph to the object(s) motion.

What is therefore needed is a re-design of the entrance system of high resolution spectrographs in which light from a wide field is not required to pass through a small aperture. For purposes of this invention, high resolution refers to resolutions greater than 500 (1 nm FWHM at 500 nm), and small aperture refers to a restriction of less than 1 mm in smallest dimension. Preferred high resolution is greater than 1000. Preferred apertures are greater than 3 mm in smallest dimension to enable a large increase in light throughput for distant objects.

DETAILED DESCRIPTION OF THE INVENTION

Figure 1:
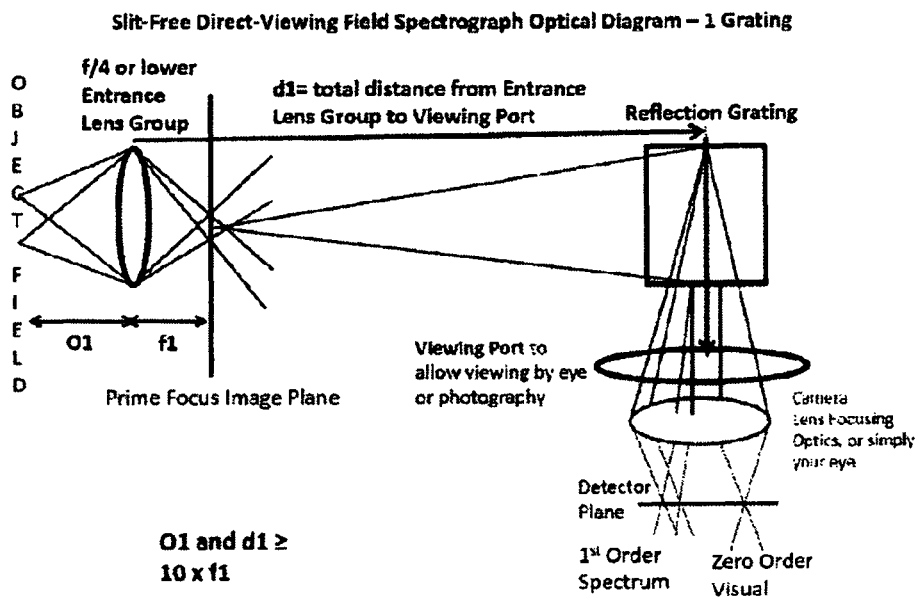
FIG. 1 illustrates a Slit-Free Direct-Viewing Field Spectrograph Optical Diagram (Grating)

In designing a high resolution spectrograph for field use, it has been surprisingly found that the usual entrance aperture can be eliminated by careful selection of the entrance lens specification and remaining spectrograph configuration. In particular, the focal length of the entrance lens must be 1/10 or less the length of the distance to the observation or image plane, and at least 1/10 times the distance to the closest object under study, preferably 1/100 or less for the latter. This leads to a specification of a very low f/# lens, less than f/4, to replace the entrance aperture, similar to King, but positive rather than negative to enhance light throughput, and of standard spherical design rather than cylindrical or aspheric as required by King and Wang, respectively. Typically, short focal length, low f/# lenses are avoided in the prior art due to spatial and chromatic aberrations, and hence, loss of resolution. For example, Wang, et al. describe the need for an aspheric telecentric lens after the entrance slit to minimize aberrations caused by multiple light paths entering the slit via multiple positions in the field of view, and this for what is calculated to be an f/4 system based on the drawings. Typical f/# for high resolution spectrographs are in the range of f/8 or more. The use of a lens less than f/4 is counter to traditional teaching and prior art for both high resolution and image quality. In spite of this, it has been surprisingly found that proper design of the rest of the spectrograph around the short focal length entrance lens can provide very high resolution and high image quality, without the need for aspheric or cylindrical elements, across a multiplex of objects in the field of observation, simultaneously.

As an example, a 1" focal length f/1 lens can be used as an entrance lens for a spectrograph designed to view an object at a distance of 10" or more away, without the use of an entrance aperture separate from the entrance lens. Without being bound by theory, it is understood that such an entrance lens will form an image of objects in the field from about 10" to infinity at a point 1" from the back-field side of the lens. Objects in the field will be reduced in size at this first image plane by the ratio of the lens focal length to the object distance from the lens. Thus, an object 1" in diameter that is 100" away will appear as a 0.01" spot in this first plane using this lens. The small spot size of the object makes it appear as if the light passed through a slit, even with none present in the device. This is true of all object points in this plane. In this case, it is important to avoid cylindrical elements to ensure proper imaging and spectra of all objects in the field of view, and hence makes this invention new and different from the work of King.

A field lens may be combined with the entrance lens to determine the angular field of view of the spectrograph. In one embodiment, the field lens is a telescope with the spectrograph set afocal to the eyepiece. In a second embodiment, the field lens is a telescope objective with the entrance lens serving as the eyepiece. In a third embodiment a negative field lens may be used to view a wider field of objects, or to view objects closer to the spectrograph. In each of these embodiments, a beam splitter or flip mirror may be used with the field lens to facilitate simultaneous or alternate visual and spectrographic recording of objects in the field of view. In each of these embodiments, the preferred dispersive elements comprise one or more echelle grating(s), combined with a cross-dispersive grating or prism set from about 45-90 degrees off the main dispersion direction of the echelle grating(s).

The spectrograph of this invention, which is shown in FIG. 1, comprises: i) an entrance lens less than f/4 with a focal length less than 1/10 the distance of objects being, viewed, preferably less than 1/100 the distance, ii) one or more dispersive elements to produce a spectrum in one or more dimensions, iii) a viewing port used to directly view the spectrum or to photograph it with a consumer camera, also located at least 10× the distance from the entrance lens as the focal length of that lens, and iv) no entrance aperture other than that of the entrance lens itself, being a minimum of 3 mm diameter. An optional field lens in front of the entrance lens sets the field of view observed by the spectrograph. An optional beam splitter or flip mirror, before or after the field lens, if present, enables simultaneous or alternate viewing of both visual and spectroscopic images. A preferred dispersive element combination is an echelle grating in combination with a cross-dispersive grating or prism.

In the most preferred embodiment of the invention, the entrance lens is from f/0.1 to f/2.0 with focal length of 2 inches or less, thereby creating a very compact high resolution spectrograph of potentially lightweight portable design. Use of lightweight enclosure materials provides a high resolution spectrograph weighing 5 pounds or less, preferably 2 pounds or less. Such a device is especially suited for field use outside the laboratory, and due to its high resolution, can also be very useful in the laboratory, taking much less bench space than corresponding high resolution units.

Figure 2:
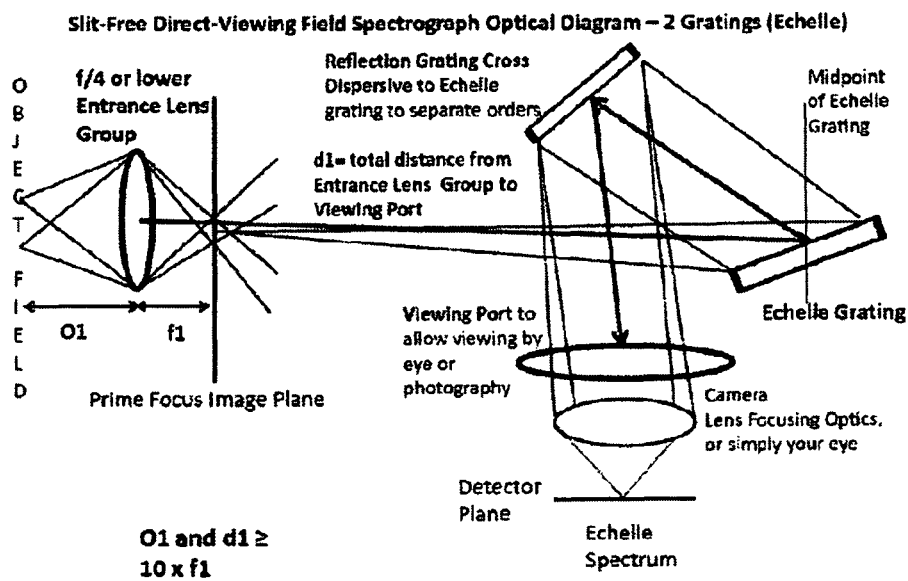
FIG. 2 illustrates a Slit-Free Direct-Viewing Field Spectrograph Optical Diagram (Echelle)

An example of the most preferred embodiment is shown in FIG. 2. This embodiment is an f/1 device in which the light path is from an object in the field at distances greater than several feet through a field lens to set angular field of view greater than several degrees. The light then passes through the f/4 or lower, preferably f/1 entrance lens to an echelle grating which directs it back toward the entrance lens within about ±30-degrees of the original path. The echelle directs the light to a cross-dispersive grating that is positioned to direct the beam about 90-degrees across the initial path to the viewing port. A 1" diameter f/1 lens with the two gratings can occupy a box of less than 10" length and 5" width, satisfying the minimum 10× observation distance from the entrance lens, yet very compact and weighing less than 1 pound using a lightweight wooden box for an enclosure.)

The spectrograph described in this most preferred practice of the invention produces a visual pattern that can be viewed directly by the eye, fully resolving the sodium D doublet at 589.0 nm and 589.6 nm with room to spare, achieving a FWHM of 0.25 nm-0.50 nm, and thus a resolution from 1000 to over 2000, without an entrance aperture. A standard retail consumer camera can photograph the visual pattern at the viewing port. With a wide angle field lens in front of the entrance lens, a field of multiple objects, even moving objects, can be summed together in the final view, with minimal or no mechanical tracking required. The multiple object spectra can be distinguished from each other using a spectral library and/or standard imaging software packages such as Adobe® Photoshop.

I claim:

1. A spectrograph comprising:
   a housing having a front, a back, a top, a bottom, a first side, a second side and a generally hollow interior;
   an entrance lens group having a focal length resulting in a focal point, wherein a focal ratio of the entrance lens group is less than f/4, wherein the entrance lens group is located at the front of the housing, wherein the entrance lens group has a diameter of at least 3 mm;
   wherein the housing lacks any aperture located between the entrance lens and an object providing a light to be observed, and wherein the entrance lens group acts as the only entrance for the light received from the object;
   a grating located within the interior of the housing; and
   a viewing port located at the back or sides of the housing wherein no apertures are located between the entrance lens group and the viewing port, and wherein the viewing port is located after the grating along a path of light to be observed, wherein a distance the path of light travels between the entrance lens group and the viewing port is at least 10× or greater the distance between the entrance lens and the focal point wherein the focal point is located on an object field.

2. The spectrograph of claim 1 where the entrance lens group is a single element.

3. The spectrograph of claim 1 where the entrance lens group is a multiple element group to provide achromatic or apochromatic performance.

4. The spectrograph of claim 1 wherein the grating diffracts light into a spectrum and directs the spectrum to a viewing port wherein the spectrum is viewed by the unaided eye.

5. The spectrograph of claim 1 wherein the grating diffracts light into a spectrum and directs the spectrum to a viewing port wherein the spectrum is recorded by an array detector after being focused by a field lens.

6. The spectrograph of claim 1 wherein the grating diffracts light into a spectrum and directs the spectrum to a viewing port wherein the spectrum is recorded through a viewing port by a camera with integrated focusing optics.

7. The spectrograph of claim 1, wherein the total weight of the spectrograph, not including a field lens, camera lens, or array detector, is less than 2 pounds.

8. The spectrograph of claim 1, wherein the total weight of the spectrograph, including a field lens, but not including a camera or array detector, is less than 3 pounds.

9. The spectrograph of claim 1, wherein the total weight of the spectrograph, including a field lens and recording device selected from a camera or array detector, is less than 5 pounds.

10. The spectrograph of claim 1 where the entrance lens group has a focal ratio from f/0.1 to f/2.0.

11. The spectrograph of claim 1 further comprising:
a beam splitter or flip mirror located before or after the entrance lens group.

12. The spectrograph of claim 1 wherein the grating is an echelle grating.

13. The spectrograph of claim 12 wherein the echelle grating has a blaze angle in the range of 45 to 80 degrees.

14. The spectrograph of claim 1 wherein the entrance lens has a focal length of 2 inches or less.

15. The spectrograph of claim 1 wherein the grating is a reflective grating.

16. The spectrograph of claim 1 wherein the spectral resolution of the entire system is such that the observed full width at half maximum is 1 nm or less for the sodium D line at 589.0 nm as produced by one or more observed light sources in the field of view.

17. The spectrograph of claim 1 wherein the grating is fixed and non-scanning.

18. A method of using a spectrograph comprising the steps of:

providing a spectrograph having an interior and having an entrance lens having a focal ratio less than f/4; and passing light through the entrance lens wherein the light travels an initial path to an echelle grating wherein the light is directed back from the echelle grating toward the entrance lens within approximately 30 degrees of the initial path to a cross-dispersive grating, wherein the cross-dispersive grating directs the light at an angle approximately orthogonal to the initial path to a viewing port, wherein a distance the light travels from the entrance lens to the viewing port is at least 10× greater than a distance between the entrance lens and a focal point of the entrance lens, and wherein the focal point is located on an object field of the entrance lens.

19. The method of using the spectrograph of claim 18 further comprising the step of:

observing and recording the simultaneous display of spectra of at least two objects separated in a field of view created at the viewing port wherein the two objects are separated from each other by at least one degree as measured from a point at the entrance lens of the spectrograph and further wherein the spectrograph does not scan or track any of the objects.

* * * * *